Jan. 24, 1956  J. SEBASKI  2,731,902
DAMPER MECHANISM FOR RADIATOR HOUSING
Filed Aug. 9, 1952
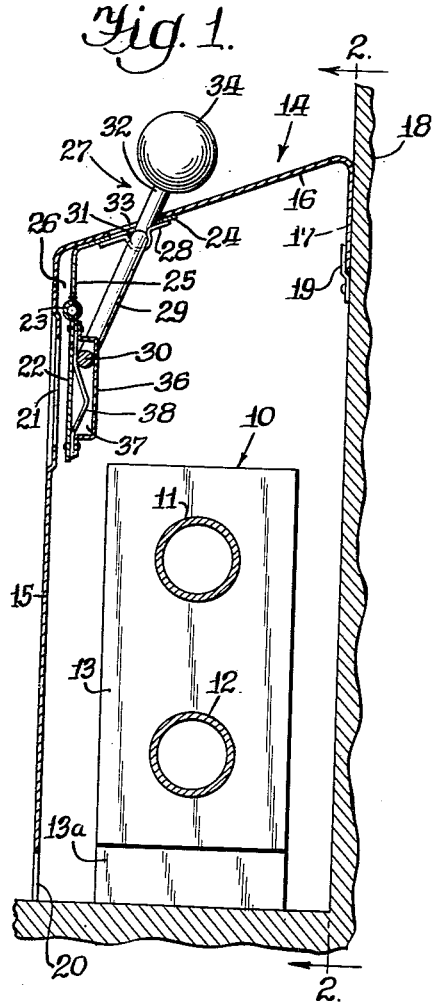
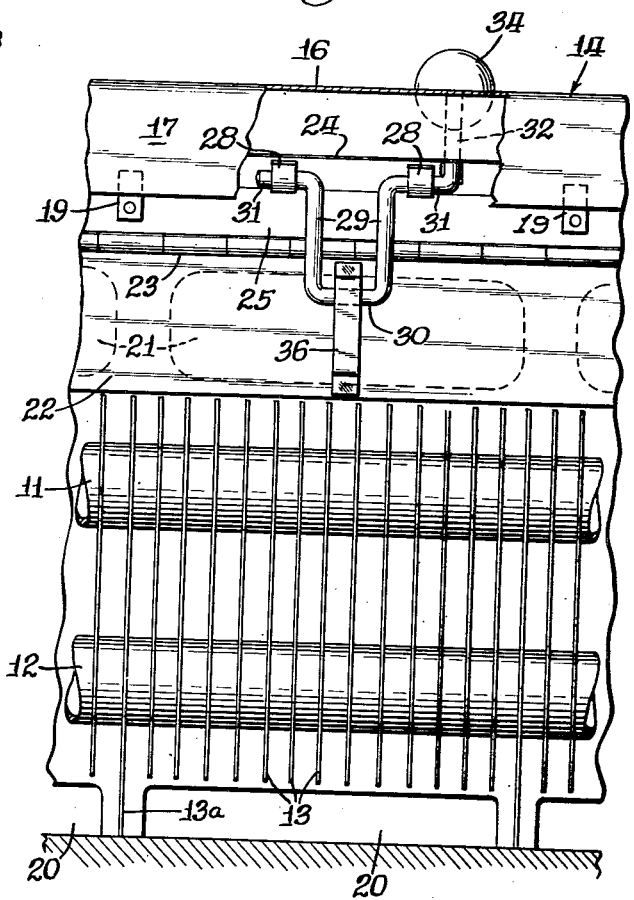
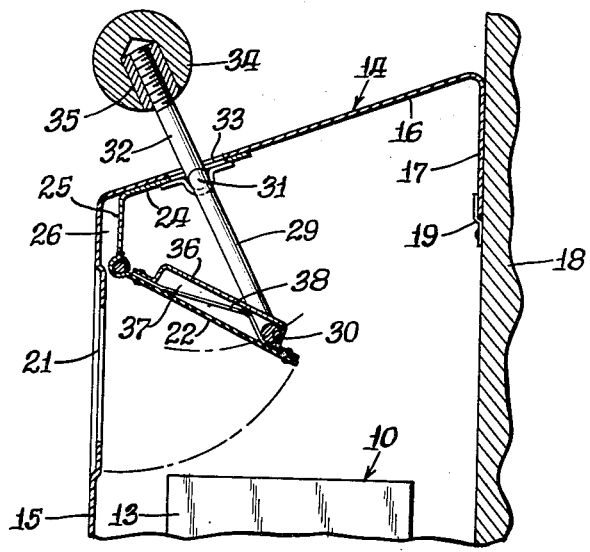
INVENTOR.
John Sebaski
BY Harvey M. Gillespie
Atty.

United States Patent Office 2,731,902
Patented Jan. 24, 1956

2,731,902
DAMPER MECHANISM FOR RADIATOR HOUSING

John Sebaski, Rosemount, Quebec, Canada, assignor to Vapor Heating Corporation, Chicago, Ill., a corporation of Delaware Application August 9, 1952, Serial No. 303,541

3 Claims. (Cl. 98—40)

This invention relates to an improved damper mechanism for actuating a damper of a radiator housing.

It is customary to provide a radiator housing with one or more dampers for controlling its outlet openings and thereby control the delivery of heated air into the room or other enclosed space being heated. The pivotal mountings of such dampers, in some instances, provide sufficient friction to support the damper in various positions of adjustment, but such frictional support is not entirely satisfactory, since it is reduced by wear of the co-engaging parts and is also affected by expansion and contraction due to changing temperatures.

It is a principal object of the present invention to provide an improved actuating means for a damper of the above character; the mechanism comprising manual operating means and a spring element, the latter of which is adapted to hold the damper in either its opened or closed position.

A more specific object of the invention contemplates improved arrangements and construction whereby the improved damper actuating mechanism may be mounted for operation in a relatively small space and, therefore, will be particularly suitable for use in connection with the dampers of baseboard radiator housings.

The invention contemplates a spring means, particularly a leaf spring, which is so positioned that it will function when the damper is moved beyond its midway position in a direction to open or close the same, to exert force on the damper tending to complete the movement of the damper and to resiliently support or retain the damper and its actuating member at the extremity of such movement; that is to say, in either the opened or closed position of the damper.

This invention relates to an improved damper mechanism for actuating a damper of a radiator housing.

The invention is illustrated in the accompanying drawings wherein:

Fig. 1 is a transverse sectional view through a conventional form of baseboard radiator and a housing structure enclosing said radiator and illustrating my improved damper actuating mechanism;

Fig. 2 is a rear view of the structure shown in Fig. 1, taken along the line of 2—2 and looking in the direction indicated by the arrows;

Fig. 3 is a fragmentary transverse section of the upper portion of the structure shown in Fig. 1, and illustrating the damper in its open position.

The radiator illustrated herein and designated generally by the numeral 10 is one conventional form of a so-called baseboard radiator; that is to say a radiator which extends along the wall of an enclosed space near the floor thereof and is ordinarily enclosed in a low shallow housing which is used as a substitute for a conventional baseboard.

A radiator, herein illustrated and designated generally by the reference numeral 10, comprises a pair of conduits 11 and 12 through which the heating medium, steam or hot water, is circulated. The conduits 11 and 12 are connected together by means of a series of spaced fins 13 which function to increase the heat radiating surface of the radiator. The radiator may be supported in a desired position by any suitable supporting means. For the purpose of providing a simplified support, certain of the fins designated 13ª are made longer than the others so as to provide supporting legs.

The housing is designated generally by reference numeral 14 and is preferably formed of a single sheet of metal which may be of any suitable length to extend entirely across a wall of a room or other enclosure. The length of the housing, therefore, will depend upon the length of the radiator to be housed. The housing 14 includes a front panel 15 and an upwardly sloping top panel 16, the inner margin of which is bent downwardly to provide an attaching flange 17. This flange may be secured to a side wall 18 of an enclosure in any suitable manner. For the purpose of convenience of illustration, I have shown the downturned flange 17 clamped to the side wall 18 by means of a plurality of clamp elements 19. The front panel 15 of the housing is formed along its lower edge which a series of openings 20 so as to permit the cooler air near the floor of the enclosure to pass into the lower portion of the housing and move upwardly therein, by convection, into heat exchange contact with the conduits 11 and 12 and the spaced fins 13. The heated air is discharged from the housing through a plurality of outlet openings 21 formed in the upper portion of the front panel 15 of the housing.

A damper 22 is movably supported within the housing 14 to open and close said discharge openings. The damper comprises a long metal strip hinged along its upper edge 23 to the lower edge of an angle hinge strip 24. This angle hinge strip 24 may be of any suitable length and is spot welded or otherwise suitably secured to the under-surface of the top panel 16 of the radiator housing. The downturned portion 25 of the angle bracket is spaced inwardly from the front panel 15 of the housing as indicated at 26 so that the damper panel, when suspended in a perpendicular position, will stand a short distance away from the edge of the outlet openings 21. The damper 22 is moved to its open and closed positions by means of a normally operable lever 27 pivotally supported in yoke strap bearings 28—28 secured, in a suitable manner, to the under face of the angular hinge strip 24. The operating lever 27 comprises a metal bar bent to provide a U-shaped double crank portion 29 connected at the lower ends of the crank by a cross bar 30. The arms of the crank are bent in opposite directions to provide spaced journals 31—31 which are pivotally supported in the strap bearings 28—28. The operating end 32 of the lever extends upwardly through a slot 33 formed in the upper panel of the housing and is provided at its upper end with a knob 34 made of "bakelite" or other suitable material. Preferably a sleeve 35 is molded in the said knob 34 and has a threaded engagement with the upper end of the lever. The lever is operatively connected to the inner face of the damper 22 by means of a bowed metal strap 36 which loosely embraces the cross bar portion 30 of the lever and is secured to the inner face of the damper panel. The configuration of the bowed strap 36, together with the adjacent surface of the damper, define an elongated slot 37 to accommodate the movements of the lever 27. A bowed leaf spring 38 is positioned between the guide 36 and the damper or slot 37. The bowed portion of the spring 38 extends into the elongated space or slot 37 defined by the guide member. When the damper 22 is in its closed position, as illustrated in Fig. 1, the operating end of the portion 32 of the lever engages the inner edge of the slot 33 and is held in this position by the weight of the damper 22. The leaf spring 38 exerts some resilient pressure against the cross bar 30 of the lever so as to hold the lever in anti-rattle engagement with the inner face of the lever guide. Movement of the operating lever from the position shown in Fig. 1 toward the position shown in Fig. 2 swings the damper 22 about its pivotal axis toward its open position. The movement of the cross bar 30 toward the lower end of the slot 37 flexes the leaf spring 38 until the damper passes beyond its midway position. At this position of the damper the portion of the spring passes the center of the cross bar 30 of the lever, whereupon the resilience of the spring urges the damper to its fully open position as shown in Fig. 3. When the damper is in its fully open position the bowed portion of the spring exerts resilient pressure against the cross bar 30 so as to hold the damper in its open position. Also the resilient pressure of the spring provides a non-rattle engagement between the damper and the lever. When the operating lever is moved in a direction to close the damper the cross bar 30 of the lever slides upwardly along the guide 36 and depresses the bowed portion of the leaf spring 38 until the center of the damper passes beyond its midway position. At this time bar 30 passes over the hump of the spring 38, whereupon the resilience of the spring urges the damper and the operating lever to the position shown in Fig. 1.

While I have shown the lower portion of the housing formed with air admission openings 20 to permit the air to pass from the interior of the enclosure into the radiator housing, it will be understood that if and when the air to be heated is forcibly circulated through the housing 14 the openings 20 along the lower edge of the front panel 15 may be omitted.

I claim:

1. The combination of a space heating radiator housing provided with an outlet for discharging heated air therefrom, a damper pivotally supported wholly within the housing for opening and closing said outlet, and means for actuating the damper comprising a lever pivotally supported on an interior portion of the housing and extending through a slot therein for external operation, a bowed metal strap secured to an inner face portion of the damper and cooperating with said face to provide an elongated slot for slidably receiving a portion of the lever, whereby movement of the lever in one direction moves the damper to a position for closing said outlet and movement of the lever in the opposite direction moves the damper in a direction to open said outlet, and a bowed leaf spring having its opposite ends secured to the damper and positioned with its bowed portion engaging said lever at a location between the inner face of the damper and said bowed metal strap for releasably holding the damper in its opened and closed positions and functioning as an anti-rattle engagement between the lever and the damper.

2. A structure as defined in claim 1 characterized in that the damper is normally spaced inwardly from the outlet of the housing, whereby the said outlet remains slightly open when the damper is in its fully closed position.

3. A structure as defined in claim 1 characterized in that the bowed portion of said leaf spring is positioned to provide oppositely disposed inclined portions which are effective, when the damper moves beyond its midway position, to urge the damper to the limit of such movement.

References Cited in the file of this patent

UNITED STATES PATENTS

| 782,707 | Symonds | Feb. 14, 1905 |
| 1,399,985 | Olinger | Dec. 13, 1921 |
| 1,726,792 | Altman et al. | Sept. 3, 1929 |
| 2,204,356 | Heasley et al. | June 11, 1940 |
| 2,434,340 | Wallen et al. | Jan. 13, 1948 |

FOREIGN PATENTS

| 530,926 | France | Oct. 12, 1921 |